(12) United States Patent
Moritani et al.

(10) Patent No.: US 10,315,610 B2
(45) Date of Patent: Jun. 11, 2019

(54) AIRBAG DEVICE

(71) Applicant: ASHIMORI INDUSTRY CO., LTD., Osaka-shi, Osaka (JP)

(72) Inventors: Keisuke Moritani, Osaka (JP); Kazuyoshi Nakai, Osaka (JP)

(73) Assignee: Ashimori Industry Co., Ltd., Osaka (JP)

( * ) Notice: Subject to any disclaimer, the term of this patent is extended or adjusted under 35 U.S.C. 154(b) by 35 days.

(21) Appl. No.: 15/611,323

(22) Filed: Jun. 1, 2017

(65) Prior Publication Data

US 2017/0355345 A1    Dec. 14, 2017

(30) Foreign Application Priority Data

Jun. 10, 2016 (JP) .................................. 2016-116610

(51) Int. Cl.
*B60R 21/233* (2006.01)
*B60R 21/235* (2006.01)
(Continued)

(52) U.S. Cl.
CPC .......... *B60R 21/233* (2013.01); *B60R 21/237* (2013.01); *B60R 21/2338* (2013.01); *B60R 21/235* (2013.01); *B60R 2021/0009* (2013.01); *B60R 2021/0023* (2013.01); *B60R 2021/0048* (2013.01); *B60R 2021/23308* (2013.01); *B60R 2021/23324* (2013.01);
(Continued)

(58) Field of Classification Search
CPC .... B60R 2021/0009; B60R 2021/0023; B60R 2021/0048; B60R 2021/23308; B60R 2021/23324; B60R 2021/23382; B60R 2021/23509; B60R 2021/23576; B60R 21/203; B60R 21/205; B60R 21/233; B60R 21/2338; B60R 21/235; B60R 21/237
See application file for complete search history.

(56) References Cited

U.S. PATENT DOCUMENTS 5,934,701 A * 8/1999 Furukawa ............. B60R 21/231
                                                            280/729
7,673,901 B2 * 3/2010 Hanawa ................ B60R 21/233
                                                            280/729
(Continued)

FOREIGN PATENT DOCUMENTS

JP          2016-043856          4/2016

*Primary Examiner* — Laura Freedman
(74) *Attorney, Agent, or Firm* — Hamre, Schumann, Mueller & Larson, P.C.

(57) ABSTRACT

The airbag device includes an airbag including a base fabric and an occupant protection fabric whose outer peripheries are joined together. The occupant protection fabric is positioned on the vehicle rear side of the base fabric and configured to restrain an occupant, and includes: at least one protruding portion that protrudes to the vehicle rear side; a flat portion that is continuously formed from the at least one protruding portion and is designed to come into contact with the occupant; and a tether that is disposed between the base fabric and the at least one protruding portion in the airbag, extending from the flat portion to the joint between the occupant protection fabric and the base fabric. The tether is joined at its end on the joint side with a base edge of the at least one protruding portion and the outer periphery of the base fabric.

5 Claims, 13 Drawing Sheets

(51) Int. Cl.
   *B60R 21/237* (2006.01)
   *B60R 21/2338* (2011.01)
   *B60R 21/00* (2006.01)

(52) U.S. Cl.
   CPC ............ *B60R 2021/23382* (2013.01); *B60R 2021/23509* (2013.01); *B60R 2021/23576* (2013.01)

(56) References Cited

U.S. PATENT DOCUMENTS

| | | | | |
|---|---|---|---|---|
| 7,681,909 B2* | 3/2010 | Idomoto | ............ | B60R 21/2346 |
| | | | | 280/729 |
| 7,862,073 B2* | 1/2011 | Thomas | ................ | B60R 21/231 |
| | | | | 280/729 |
| 8,579,321 B2* | 11/2013 | Lee | ...................... | B60R 21/214 |
| | | | | 280/729 |
| 8,678,429 B2* | 3/2014 | Nagasawa | ............ | B60R 21/233 |
| | | | | 280/729 |
| 8,876,153 B2* | 11/2014 | Dix | ...................... | B60R 21/233 |
| | | | | 280/729 |
| 9,205,798 B1* | 12/2015 | Jindal | ..................... | B60R 21/16 |
| 9,358,945 B2* | 6/2016 | Yamada | ............... | B60R 21/233 |
| 9,428,139 B2* | 8/2016 | Yamada | ............... | B60R 21/233 |
| 9,499,118 B2* | 11/2016 | Jindal | ................... | B60R 21/231 |
| 9,550,465 B1* | 1/2017 | El-Jawahri | ........ | B60R 21/01512 |
| 9,561,774 B2* | 2/2017 | Cheng | .................. | B60R 21/203 |
| 9,650,011 B1* | 5/2017 | Belwafa | ............... | B60R 21/233 |
| 9,676,355 B2* | 6/2017 | Kruse | ................. | B60R 21/0136 |
| 9,694,782 B2* | 7/2017 | Nagatani | ............... | B60R 21/203 |
| 9,738,243 B2* | 8/2017 | Fukawatase | ........ | B60R 21/2338 |
| 9,758,123 B2* | 9/2017 | Yamada | ............. | B60R 21/2338 |
| 9,789,842 B2* | 10/2017 | Shin | .................. | B60R 21/2176 |
| 9,845,067 B2* | 12/2017 | Morris | .................. | B60R 21/233 |
| 2006/0163848 A1* | 7/2006 | Abe | ...................... | B60R 21/231 |
| | | | | 280/729 |
| 2018/0065583 A1* | 3/2018 | Tabushi | ................ | B60R 21/205 |
| 2018/0065587 A1* | 3/2018 | Maenishi | ............. | B60R 21/205 |
| 2018/0111583 A1* | 4/2018 | Jaradi | ................... | B60R 21/205 |
| 2018/0162312 A1* | 6/2018 | Faruque | ................ | B60R 21/239 |

* cited by examiner

AIRBAG DEVICE

CROSS-REFERENCE TO RELATED APPLICATIONS

The present application claims priority under 35 U.S.C. § 119 to Japanese Patent Application No. 2016-116610, filed on Jun. 10, 2016, the contents of which are incorporated herein by reference in their entirety.

BACKGROUND OF THE INVENTION

Field of the Invention

The present invention relates to airbag devices. Specifically, the present invention relates to an airbag device that is suited for occupant protection in an oblique collision of a vehicle, such as small overlap impact or oblique impact, and is disposed on the vehicle front side of an occupant.

Discussion of the Background

Oblique crash tests such as a small overlap impact test have attracted attention as tests to evaluate the crashworthiness of vehicles. For example, in a small overlap impact test, as illustrated in FIG. 21, an oblique front part of a vehicle 1 strikes an obstacle 2 to simulate a collision into a thin object such as a tree or a utility pole. In the small overlap impact, the force is generated which moves an occupant 10 obliquely forward relative to the vehicle 1.

Airbag devices (hereinafter, also referred to as "frontal airbags") disposed on the vehicle front side of an occupant are desired to pass such oblique crash tests. Conventional typical front airbags, however, are inflated and deployed to a generally spherical shape by the pressure (inner pressure) in the airbags, and are therefore insufficient in the function to prevent the occupant from moving laterally. Accordingly, frontal airbags have been developed which can protect an occupant by properly catching the occupant who moves obliquely forward in an oblique collision.

For example, an airbag device for a passenger seat disclosed in JP 2016-043856 A is intended to catch a passenger moving obliquely forward, including a main inflation portion provided to prevent the passenger from moving forward in a frontal collision of a vehicle and a protruding inflation portion provided to prevent the passenger from moving laterally in an oblique collision of the vehicle.

SUMMARY OF INVENTION

The airbag device for a passenger seat disclosed in JP 2016-043856 A uses tethers (for example, the components with reference signs 98 and 99 in FIGS. 21 and 22) to control the shape of the protruding inflation portion in an inflated and deployed state. Use of tethers, however, can be a problem because it requires a lot of work to attach tethers to the inside of an airbag and it is difficult to check whether the tethers are properly attached later.

The present invention has been made to solve the above problems, and aims to provide an airbag device that can protect an occupant moving obliquely forward in a collision and has excellent productivity.

One aspect of the present invention for solving the problems described above and achieving the aim is an airbag device to be mounted in a vehicle, including an inflator configured to generate a gas; and an airbag including a base fabric and an occupant protection fabric whose outer peripheries are joined together. The base fabric is provided with an installation hole for the inflator. The occupant protection fabric is positioned on the vehicle rear side of the base fabric and configured to restrain an occupant, and includes: at least one protruding portion that is disposed along the outer periphery of at least one side of the occupant protection fabric in the vehicle width direction and configured to protrude to the vehicle rear side; a flat portion that is continuously formed from the at least one protruding portion and is designed to come into contact with the occupant; and a tether that is disposed between the base fabric and the at least one protruding portion in the airbag, extending from the flat portion to the joint between the occupant protection fabric and the base fabric. The tether is joined at its end on the joint side with a base edge of the at least one protruding portion and the outer periphery of the base fabric.

Another aspect of the present invention is an airbag device to be mounted in a vehicle, including: an inflator configured to generate a gas; and an airbag including a base fabric and an occupant protection fabric whose outer peripheries are joined together. The base fabric is provided with an installation hole for the inflator. The occupant protection fabric is positioned on the vehicle rear side of the base fabric and configured to restrain an occupant, and includes: a flat portion that covers the vehicle rear side of the base fabric and is provided with at least one communication hole on at least one side of the flat portion in the vehicle width direction; and at least one protruding portion that covers the at least one communication hole from the vehicle rear side, is disposed along the outer periphery of at least one side of the occupant protection fabric in the vehicle width direction, and configured to protrude to the vehicle rear side from the flat portion. The outer periphery of at least one side of the flat portion in the vehicle width direction, constituting the outer periphery of the occupant protection fabric, is joined with a base edge of the at least one protruding portion and the outer periphery of the base fabric.

The statements herein concerning the shape of the airbag are based on an inflated and deployed state, unless otherwise specified.

The airbag device of the present invention can protect an occupant moving obliquely forward in a collision and has excellent productivity.

DESCRIPTION OF THE EMBODIMENTS

Hereinafter, airbag devices of embodiments of the present invention are described with reference to the drawings.
(Embodiment 1)

Figure 1:
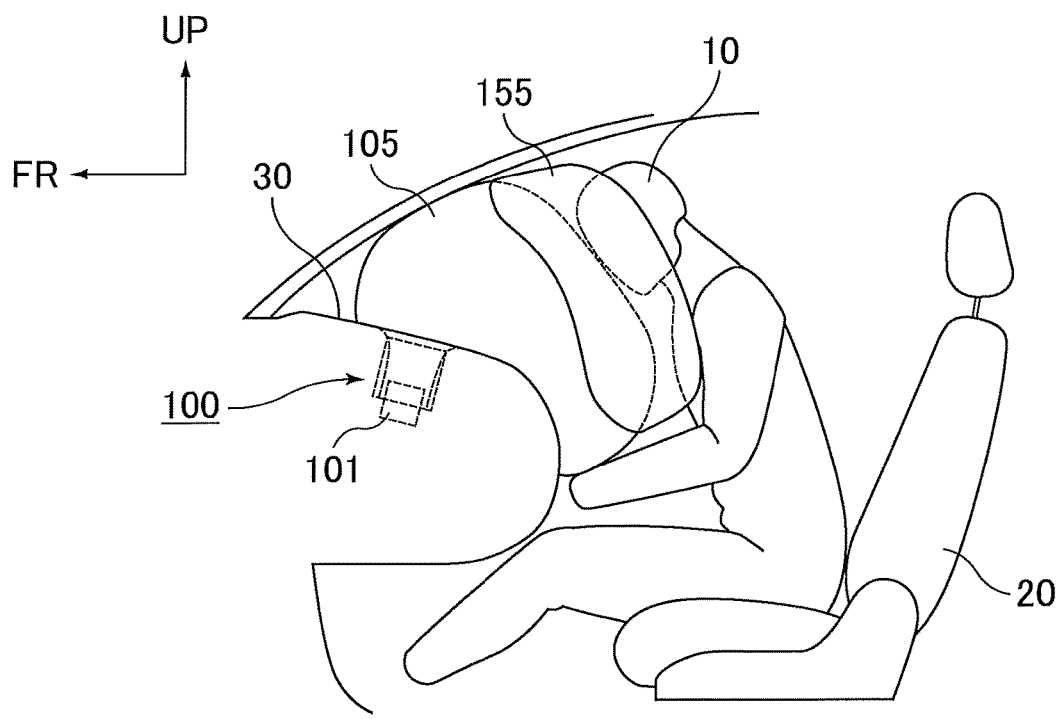
FIG. 1 illustrates the activated state of an airbag device of Embodiment 1 as viewed from the side of a vehicle.
Figure 2:
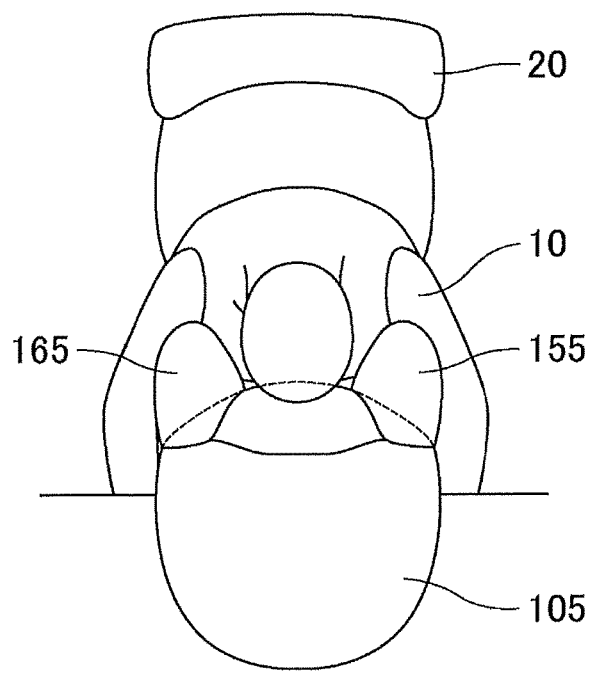
FIG. 2 illustrates the activated state of the airbag device of Embodiment 1 as viewed from above the vehicle.

First, the activated state of an airbag device of Embodiment 1 is described with reference to FIGS. 1 and 2. The arrow FR and arrow UP illustrated in FIG. 1 respectively indicate the forward direction and the upward direction of a vehicle. An airbag device 100 of Embodiment 1 at least includes an inflator (gas generator) 101 and a bag-like airbag 105, and is disposed at the inner upper surface of an instrument panel 30 in front of a passenger seat 20. When a collision of the vehicle is detected and then the airbag device 100 is activated, the airbag 105 is rapidly inflated by the gas generated by the inflator 101. The inflated airbag 105 pushes open the upper surface of the instrument panel 30 to come out to the interior space of the vehicle and be inflated and deployed, coming into contact with the occupant 10 who has moved forward by the collision impact.

The airbag 105, when inflated and deployed, includes protruding portions 155 and 165 on the respective sides in the width direction of the vehicle. These protruding portions 155 and 165 can prevent the occupant 10 from moving away from the airbag 105 and can appropriately protect the occupant 10 even when the occupant 10 moves obliquely forward as in the case of an oblique collision. The airbag device 100 of Embodiment 1 has a feature in the structure of the airbag 105 whose protruding portions 155 and 165 can be formed by simple processes.

The inflator 101 is activated in a frontal collision of the vehicle. First, when an impact sensor mounted on the vehicle detects a frontal collision of the vehicle, the sensor transmits a signal to ECU and the ECU calculates and determines the collision level. If the determined collision level corresponds to a level at which the airbag 105 should be inflated, the inflator 101 is ignited to generate a gas through a chemical reaction by combustion. The generated gas is emitted into the airbag 105 through gas exhaust holes of the inflator 101. The inflator 101 may be of any type, and may be a pyrotechnic inflator which utilizes a gas generated by combusting a gas-generating agent, a stored gas inflator utilizing a compressed gas, or a hybrid inflator utilizing a gas mixture of a gas generated by combusting a gas-generating agent and a compressed gas, for example.

The airbag 105 is stowed in a folded state at the inner upper surface of the instrument panel 30 before the inflator 101 is activated. When the inflator 101 is activated, the gas generated by the inflator 101 is introduced into the airbag 105 such that the airbag 105 is inflated and deployed while unfolded.

For the other components of the airbag device 100, known airbag structures for a passenger seat can be utilized. The airbag device 100 may include, for example, an airbag cover for the airbag 105 and a housing member to which the inflator 101 and the airbag 105 are attached. The airbag device 100 is mounted at the inner upper surface of the instrument panel 30 by fixation with bolts to a fixing component of the vehicle in the instrument panel 30.

Figure 3:
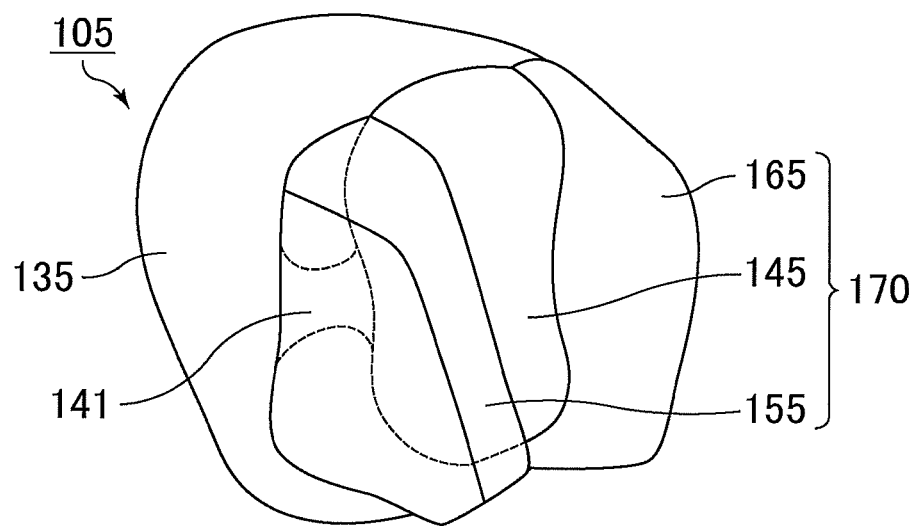
FIG. 3 is a perspective view of an airbag in Embodiment 1.
Figure 4:
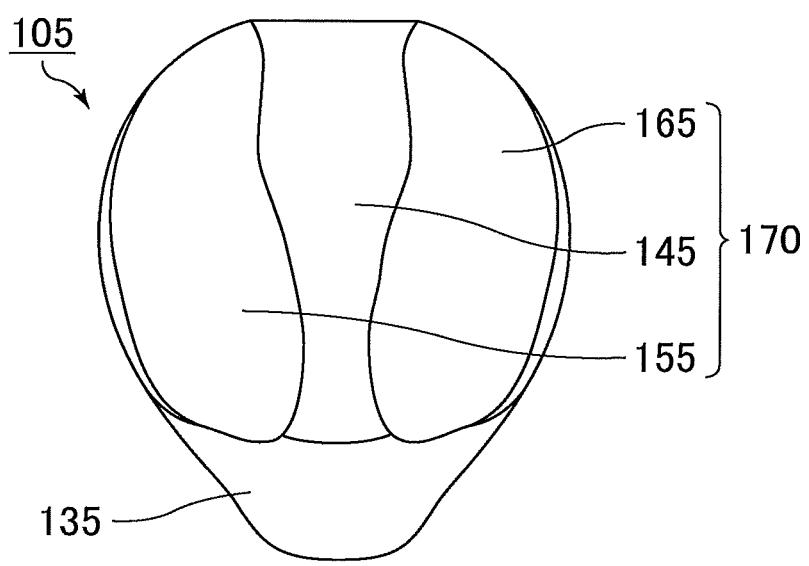
FIG. 4 is a front view of the airbag in Embodiment 1.
Figure 5:
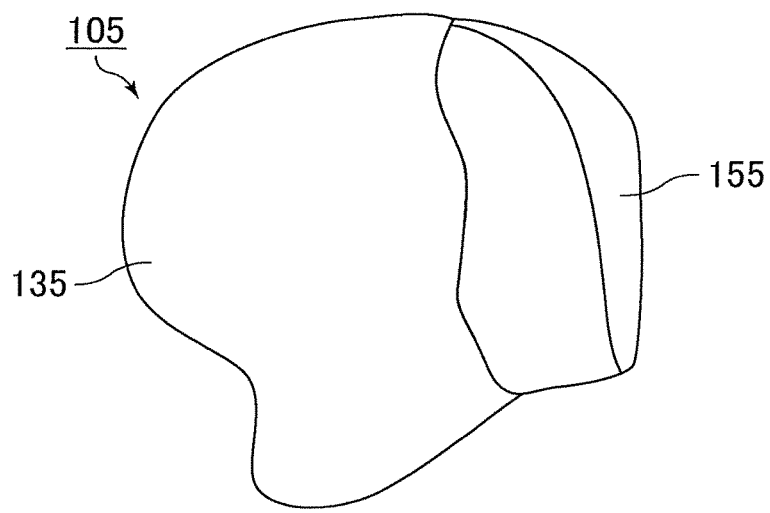
FIG. 5 is a side view of the airbag in Embodiment 1.
Figure 6A:
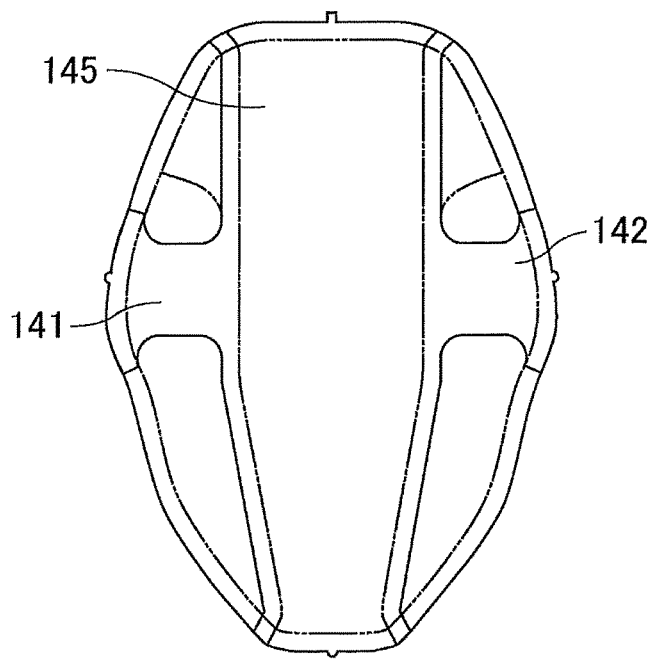
FIG. 6A illustrates a cross section of the airbag in Embodiment 1 including a flat portion.
Figure 6B:
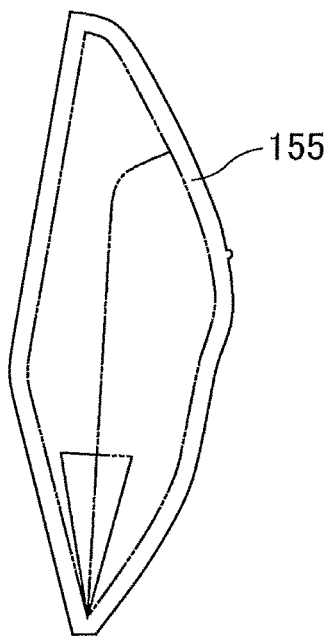
FIG. 6B is a cross-sectional view of a protruding portion in the airbag in Embodiment 1.

Referring to FIGS. 3 to 6, the inflated and deployed airbag is described in more detail. FIG. 3 is a perspective view of the airbag in Embodiment 1. FIG. 4 is a front view of the airbag in Embodiment 1. FIG. 5 is a side view of the airbag in Embodiment 1. FIG. 6A illustrates a cross section of the airbag in Embodiment 1 including a flat portion. FIG. 6B is a cross-sectional view of the protruding portion in the airbag in Embodiment 1. As illustrated in FIGS. 3 to 6, the airbag 105 has a structure in which an opening of a tubular base fabric 135 on the vehicle rear side (occupant side) is covered with an occupant protection fabric 170, and the outer periphery of the opening of the base fabric 135 and the outer periphery of the occupant protection fabric 170 are joined. The joining may be achieved by sewing, adhesion, or welding, for example, and sewing is preferred. The case of employing sewing is described below. The two-dot chain lines in the drawings indicate the parts already sewn or to be sewn later.

The base fabric 135 includes a tubular portion and a bottom portion that covers the opening of the tubular portion on the vehicle front side. The vehicle rear side of the tubular portion is left open. The tubular portion is produced by rolling a band-like base fabric piece for a tubular portion and joining the shorter edges of the band-like base fabric piece. The bottom portion is formed from a base fabric piece for a bottom portion that has a substantially oval shape designed to fit the shape of the opening of the tubular portion. The bottom portion has an inflator installation hole at the center.

The occupant protection fabric 170 is positioned on the vehicle rear side of the base fabric 135 and has a function to restrain the occupant in a collision of the vehicle. The occupant protection fabric 170 has an overall shape with the outer periphery protruding to the vehicle rear side on the sides of the fabric in the vehicle width direction and with a recess at the center. In a frontal collision of the vehicle, the occupant moving forward comes into contact with the recess at the center, i.e., the flat portion 145. Also, even in the case that the occupant moves obliquely forward in an oblique collision, one of the paired protruding portions 155 and 165 on the respective sides of the flat portion 145 can catch the occupant to restrain the movement of the occupant in the width direction of the vehicle.

The base edge of each of the protruding portions 155 and 165 on one side is joined with the outer periphery of the flat portion 145, and the base edge on the other side is joined with the outer periphery of the base fabric 135. The protruding portions 155 and 165 are each inflatable into a predetermined shape by the respective tethers 141 and 142 provided in the airbag 105.

Figure 7:
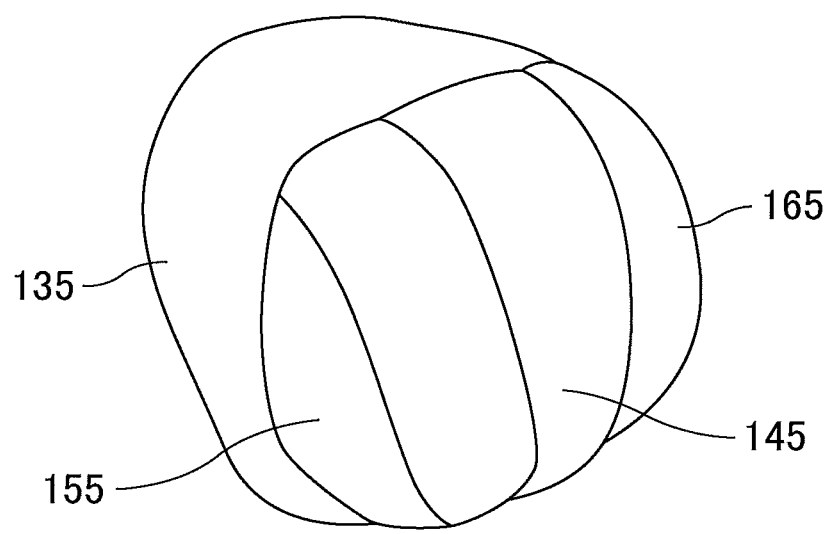
FIG. 7 is a schematic perspective view of the three-dimensional shape of an airbag for comparison in an inflated state in the case that the airbag for comparison has the same structure as the airbag in Embodiment 1 except that the airbag for comparison is not provided with a tether.

The functions of the tethers 141 and 142 are described. The airbag 105 is designed to be inflated and deployed into a generally spherical shape by the pressure (inner pressure) in the airbag 105. In other words, the airbag 105 is inflated such that the occupant protection fabric 170, especially the flat portion 145 arranged at the center, moves away from the base fabric 135. The flat portion 145 of the inflated airbag 105 pulls the parts of the protruding portions 155 and 165 joined with the flat portion 145 toward the center of the occupant protection fabric 170. Here, without the tethers 141 and 142, the airbag 105 would fail to have a recess at the center as illustrated in FIG. 7 and thereby fail to catch the occupant moving in the width direction of the vehicle by the protruding portions 155 and 165. In contrast, with the tethers 141 and 142 each integrated with the flat portion 145 at one edge and joined with the outer periphery of the occupant protection fabric 170 at the other edge, the parts of the protruding portions 155 and 165 joined with the flat portion 145 can be prevented from being excessively pulled and stretched to move toward the center. As described above, the tethers 141 and 142 can function to control the shapes of the protruding portions 155 and 165 in an inflated state.

The structure of each of the tethers 141 and 142 is described. The tethers 141 and 142 each extend from the flat portion 145 to the joint between the occupant protection fabric 170 and the base fabric 135, and respectively join the edge of the flat portion 145 with the outer peripheries of the occupant protection fabric 170 and the base fabric 135 on the vehicle front side of the protruding portions 155 and 165. In other words, the tethers 141 and 142 respectively join the base edges of the protruding portions 155 and 165 on one side with the base edges thereof on the other side. As a result, the tensions generated on the tethers 141 and 142 keep the widths of the respective protruding portions 155 and 165 within the lengths of the respective tethers 141 and 142.

In the present embodiment, the edges of the tethers 141 and 142 on one side are integrated with the flat portion 145. Also, the edges of the tethers 141 and 142 on the other side are joined with the outer periphery of the occupant protection fabric 170 (the base edges of the respective protruding portions 155 and 165 on the other side) and the outer periphery of the base fabric 135. Installation of the tethers 141 and 142 is therefore completed simply by involving the joint-side edges of the tethers 141 and 142 in joining the occupant protection fabric 170 with the base fabric 135. The method of producing the airbag 105 in the present embodiment is described in more detail below. Since the airbag in the airbag device of the present embodiment having a shape suited for occupant protection in oblique collisions can be produced by uncomplicated processes, the airbag in the present embodiment has significantly increased productivity compared with conventional airbags for the same use.

The preferred positions of the tethers 141 and 142 in the vehicle top-down direction are respectively around the centers of the protruding portions 155 and 165 in the vehicle top-down direction or are at about the same height as that of the head of the occupant. Here, the relationship between the position and size of the inflated and deployed airbag and the occupant is determined using, for example, a world frontal impact dummy (Hybrid III) or a next-generation world frontal impact dummy (THOR dummy), the successor of Hybrid III. The sitting posture of a world frontal impact dummy is determined in accordance with the regulation on the frontal collision protection (ECE R94) currently used in Japan and Europe or the frontal crash protection standards (FMVSS 208) used in the U.S.

The airbag 105 preferably consists of the base fabric 135 and the occupant protection fabric 170, but may also include any other components. The occupant protection fabric 170 preferably consists of the tethers 141 and 142, the flat portion 145, and the protruding portions 155 and 165, but may also include any other components.

Figure 8:
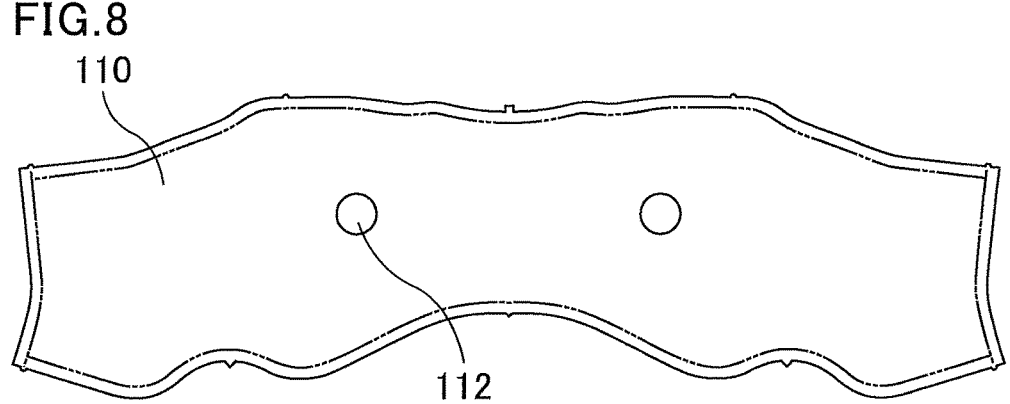
FIG. 8 includes schematic plan views of components in the airbag in Embodiment 1.
Figure 8:
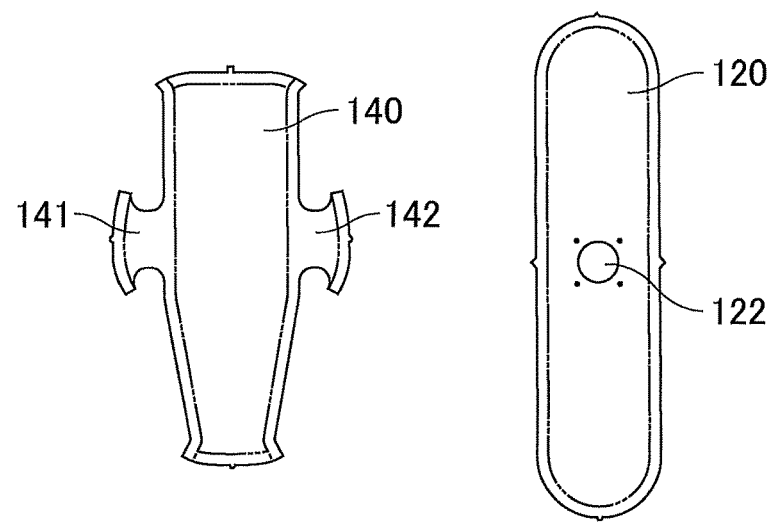
Figure 8:
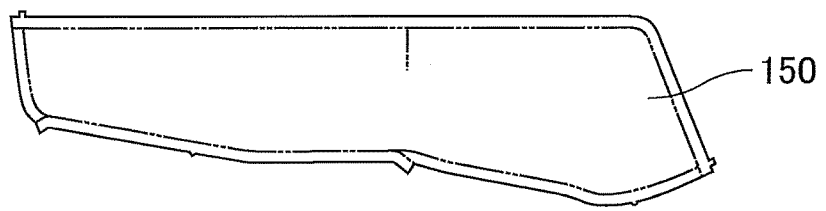
Figure 8:
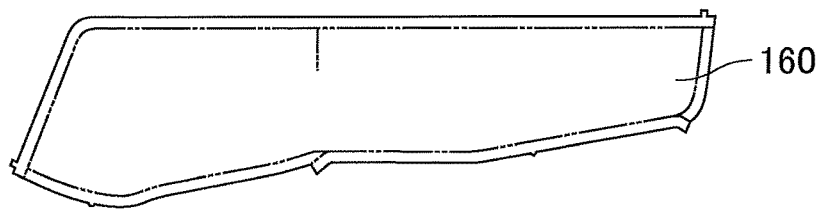

The method of producing the airbag 105 of the present embodiment is described. FIG. 8 includes schematic plan views of components used in production of the airbag of the present embodiment. The airbag 105 of the present embodiment is produced by joining five pieces of fabric illustrated in FIG. 8, namely a base fabric piece 110 for a tubular portion, a base fabric piece 120 for a bottom portion, a base fabric piece 140 for a flat portion, and paired band-like base fabric pieces (base fabric pieces for protruding portions) 150 and 160, by sewing.

The base fabric piece 110 for a tubular portion and the base fabric piece 120 for a bottom portion are materials of the base fabric 135. The base fabric 135 is formed to have a tubular shape with an opening on one side. The base fabric piece 110 for a tubular portion constitutes the side surface of the tubular shape and the base fabric piece 120 for a bottom portion constitutes the bottom surface of the tubular shape. The length of the outer periphery of the base fabric piece 120 for a bottom portion is therefore the same as the outer periphery of the base fabric piece 110 for a tubular portion on one side in the longitudinal direction.

The base fabric piece 110 for a tubular portion preferably includes vent holes 112 for exhausting a gas in the airbag. When the inflated and deployed airbag 105 is pressed by the occupant 10, the inner pressure in the airbag 105 increases, leading to an increased reaction force of the airbag 105. Since an over-hard airbag 105 may damage the occupant 10, the gas in the airbag 105 is appropriately exhausted through the vent holes 112 so that the absorption characteristics of the airbag 105 can be controlled. The vent holes 112 may be arranged at any positions in the airbag 105 in the present embodiment, and may be arranged in a component other than the base fabric piece 110 for a tubular portion. The number and size of the vent holes 112 can also be appropriately selected to achieve the desired absorption characteristics.

The base fabric piece 120 for a bottom portion includes an inflator installation hole 122. To the inflator installation hole 122 is inserted the portion with gas exhaust holes of the inflator 101. Thereby, the gas generated by the inflator 101 can be supplied into the airbag 105.

The base fabric piece 140 for a flat portion and the paired band-like base fabric pieces 150 and 160 are materials of the occupant protection fabric 170. The base fabric piece 140 for a flat portion is positioned between the paired protruding portions 155 and 165 in the airbag 105, and includes the flat portion 145 designed to come into contact with the occupant and the paired tethers 141 and 142 extending laterally from the respective longitudinal sides of the flat portion 145. The paired band-like base fabric pieces 150 and 160 are used to form the paired protruding portions 155 and 165 of the occupant protection fabric 170.

The above five pieces of fabric can be formed from, for example, nylon 66 yarn or polyethylene terephthalate (PET) yarn. In order to improve the heat resistance and the air-tightness, the surface of the airbag 105 may be covered with an inorganic material such as silicone. In the present embodiment, the inner surface of the airbag 105 which retains a gas is coated with silicone. The silicone coating increases the inner pressure in the deployed airbag 105 and thereby hardens the flat portion 145 and the protruding portions 155 and 165. The airbag 105 therefore can catch the occupant 10 with a stronger reaction force, and may be advantageous in restraint of the occupant 10. The inside and the outside of each of the above five pieces of fabric are determined by the presence or absence of the silicone coating. Hereinafter, the surface with the silicone coating (silicone-coated surface) is also referred to as the "inside" (corresponding to the inner surface of the airbag 105 in use) while the surface without the silicone coating is also referred to as the "outside" (corresponding to the outer surface of the airbag 105 in use).

Although a smaller number of base fabric pieces used in production of the airbag 105 is more advantageous in terms of simplification of the processes, any number of base fabric pieces may be used. For example, the base fabric piece 140 for a flat portion illustrated in FIG. 8, which is one piece, may be replaced by a base fabric piece 140 for a flat portion produced by joining separate fabric pieces for the flat portion 145 and the tethers 141 and 142. Also, the base fabric 135 may be formed from one piece of fabric instead of the base fabric piece 110 for a tubular portion and the base fabric piece 120 for a bottom portion joined together.

Next, with reference to FIGS. 9 to 16, the processes of producing the airbag 105 of the present embodiment are sequentially described. As described below, the present embodiment employs a method that includes joining five pieces of fabric, namely the base fabric piece 110 for a tubular portion, the base fabric piece 120 for a bottom portion, the base fabric piece 140 for a flat portion, and paired band-like base fabric pieces 150 and 160, into a bag-like shape, and reversing the bag so that the inside and the outside of the bag are put opposite (turning the bag inside out). In FIGS. 9 to 16, the inside (silicone-coated surface) of the bag, which is designed to constitute the interior side of the reversed bag, is illustrated in color.

Figure 9A:
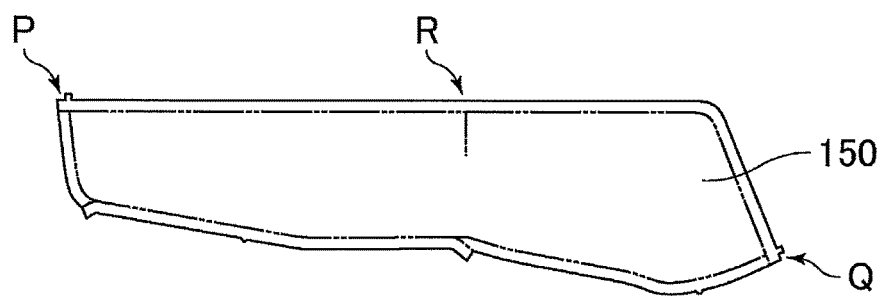
FIGS. 9A-C illustrate a method of producing an inside-out protruding portion of an occupant protection fabric in Embodiment 1, with FIG. 9A being a plan view of a band-like fabric piece used in production of a protruding portion, FIG. 9B being a perspective view for describing the process of folding the band-like base fabric piece, and FIG. 9C being a perspective view of the produced inside-out protruding portion.
Figure 9B:
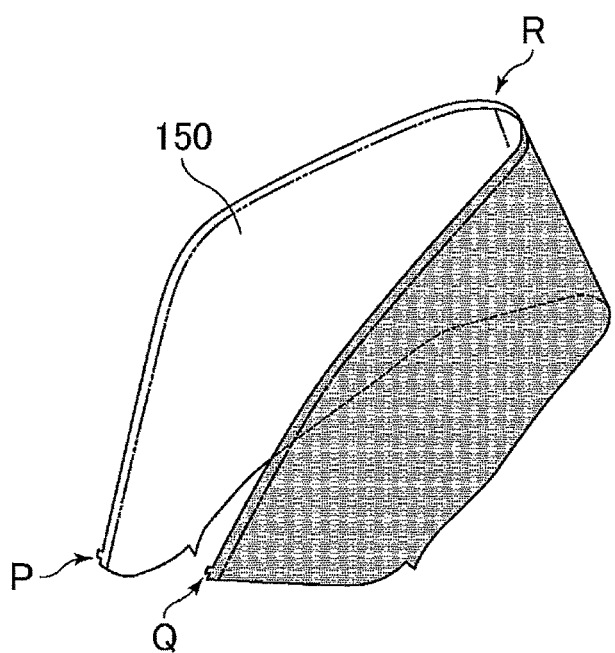
Figure 9C:
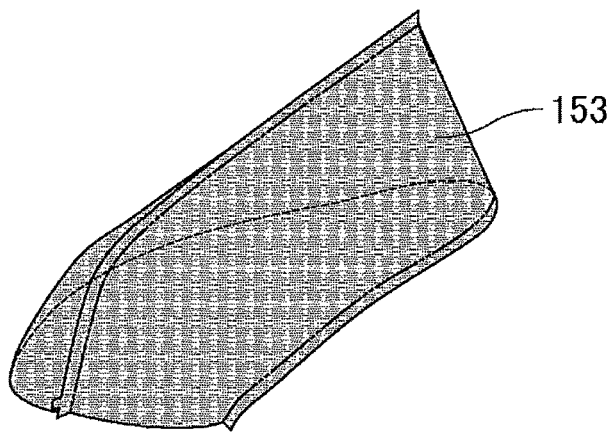

FIG. 9 illustrate a method of producing an inside-out protruding portion 153 of the occupant protection fabric 170. The protruding portion 153 is produced by forming the band-like base fabric piece 150 into a boat-like three-dimensional shape. First, the substantially rectangular band-like base fabric piece 150 as illustrated in FIG. 9A is prepared. Then, as illustrated in FIG. 9B, the band-like base fabric piece 150 is folded in half at a folding point R, so that apexes P and Q at the diagonally opposite ends of the band-like base fabric piece 150 are brought together. Here, the inside of the band-like base fabric piece 150 is on the outer side. The edges overlapped by the folding are then sewn in flat (flat fabric pieces are overlapped and sewn) along the outer periphery connecting the point R and the point at which the apexes P and Q were brought together, as illustrated in FIG. 9C. Thereby, the band-like base fabric 150 illustrated in FIG. 9A has, when deployed, a boat-like three-dimensional shape in which the folded edges connecting the apexes P and Q on one side are joined along the outer periphery with the point R as a folding point, and the edges connecting the apexes P and Q on the other side constitute a ring-shaped open edge. Such a method enables formation of the three-dimensional protruding portion 153 just by flat sewing without three-dimensional sewing, thereby simplifying the processes. In the present embodiment, the band-like base fabric piece 160 is processed by the same method so that one more inside-out protruding portion is produced.

Figure 10:
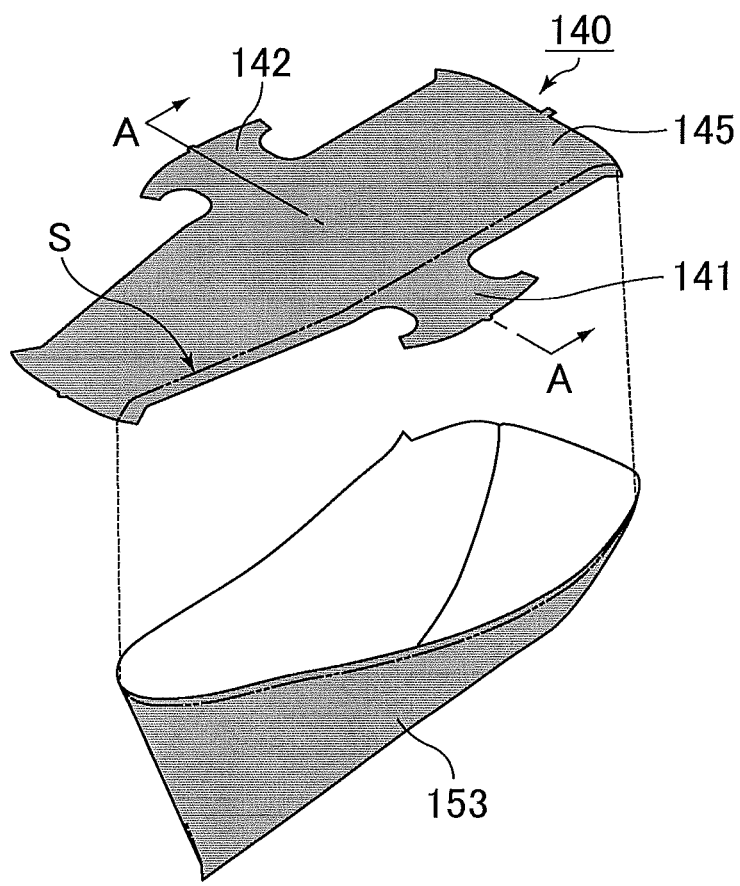
FIG. 10 is a perspective view for describing the process of joining the inside-out protruding portion of an occupant protection fabric in Embodiment 1 with a base fabric piece for a flat portion.
Figure 11:
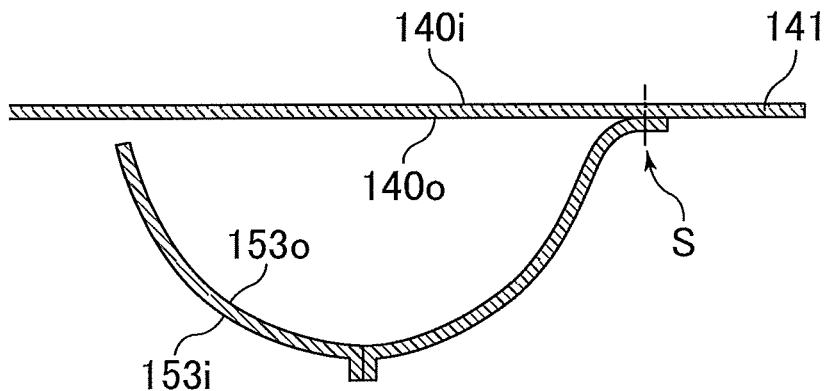
FIG. 11 is a cross-sectional view taken along the line A-A in FIG. 10.

FIG. 10 illustrates the process of joining the inside-out protruding portion 153 of the occupant protection fabric 170 with the base fabric piece 140 for a flat portion. FIG. 11 is a cross-sectional view taken along the line A-A in FIG. 10. When the protruding portion 153 and the base fabric piece 140 for a flat portion are joined, an outside 153o of the protruding portion and an outside 140o of the base fabric piece for a flat portion are brought in contact with each other. The base fabric piece 140 for a flat portion from one edge in the longitudinal direction to the other edge and a part of the ring-shaped open edge (base edge) of the protruding portion 153 are sewn along the outer periphery of the flat portion 145. Here, since the open edge of the protruding portion 153 is easily deformable, it is easy to sew the base fabric piece 140 for a flat portion and the open edge of the protruding portion 153 along the outer periphery of the flat portion 145 while aligning the base fabric piece and the open edge. The sewing process can be made accurate and simple by placing the base fabric piece 140 for a flat portion on the bottom side and the protruding portion 153 on the worker side. The rest of the open edge of the protruding portion 153 will be used as the outer periphery of the occupant protection fabric 170 which is to be joined with the outer periphery of a base fabric 130 in a subsequent process.

Figure 12A:
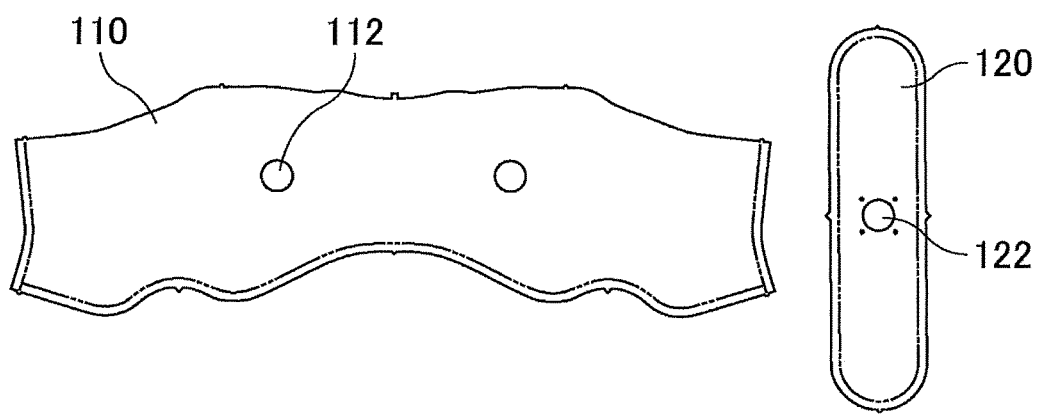
FIGS. 12A-B illustrate a method of producing an inside-out base fabric in Embodiment 1, with FIG. 12A including plan views of components used in production of a base fabric, and FIG. 12B being a perspective view of the produced inside-out base fabric.
Figure 12B:
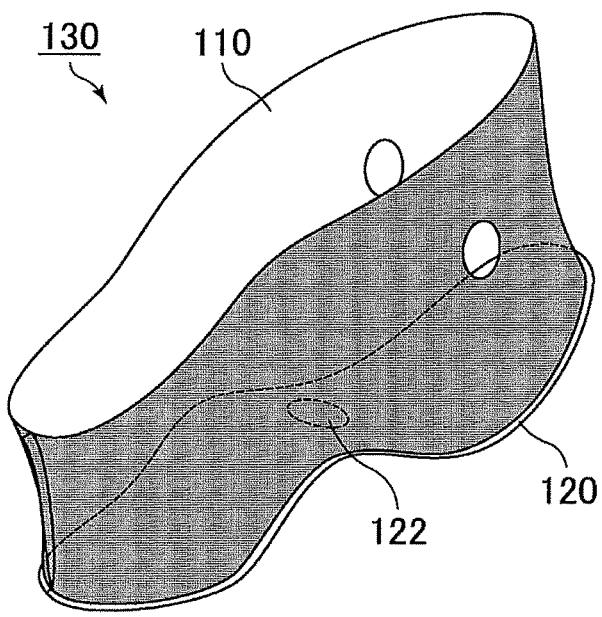

FIG. 12 illustrate a method of producing the inside-out base fabric 130 of Embodiment 1. The first step of the process forming the base fabric is preparing the band-like base fabric piece 110 for a tubular portion and the base fabric piece 120 for a bottom portion as illustrated in FIG. 12A. The band-like base fabric piece 110 for a tubular portion is rolled and the shorter edges are joined to form a tubular workpiece. One of the open edges of the tubular workpiece is joined with the outer periphery of the base fabric piece 120 for a bottom portion. Thereby, the base fabric 130 having a shape as illustrated in FIG. 12B is produced.

Figure 13:
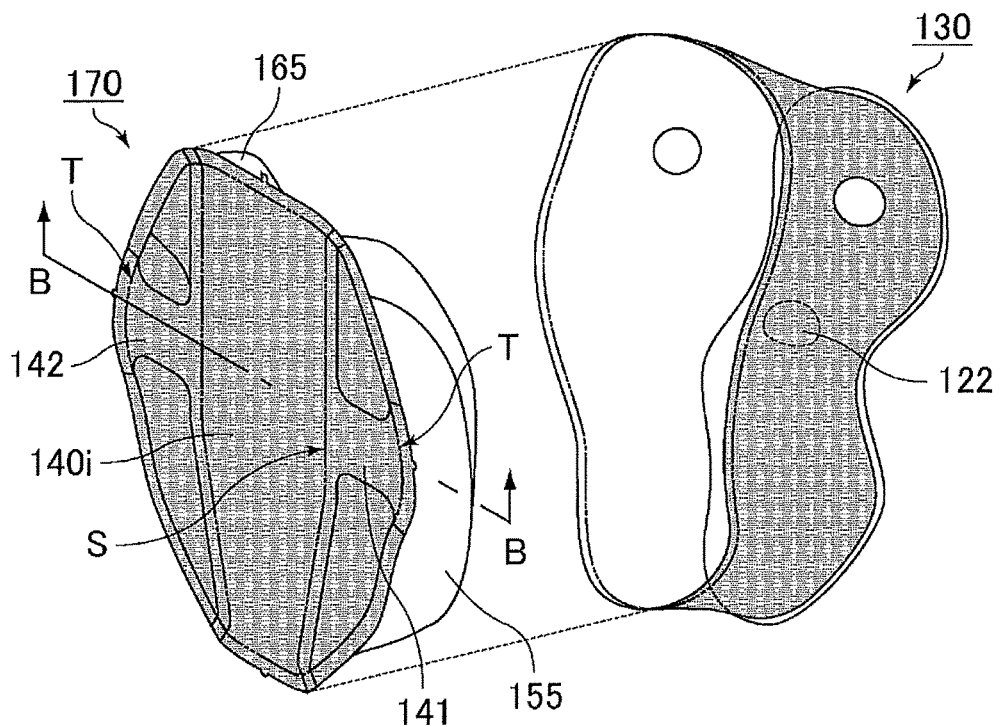
FIG. 13 is a perspective view for describing the process of joining the occupant protection fabric and the inside-out base fabric in Embodiment 1.
Figure 14:
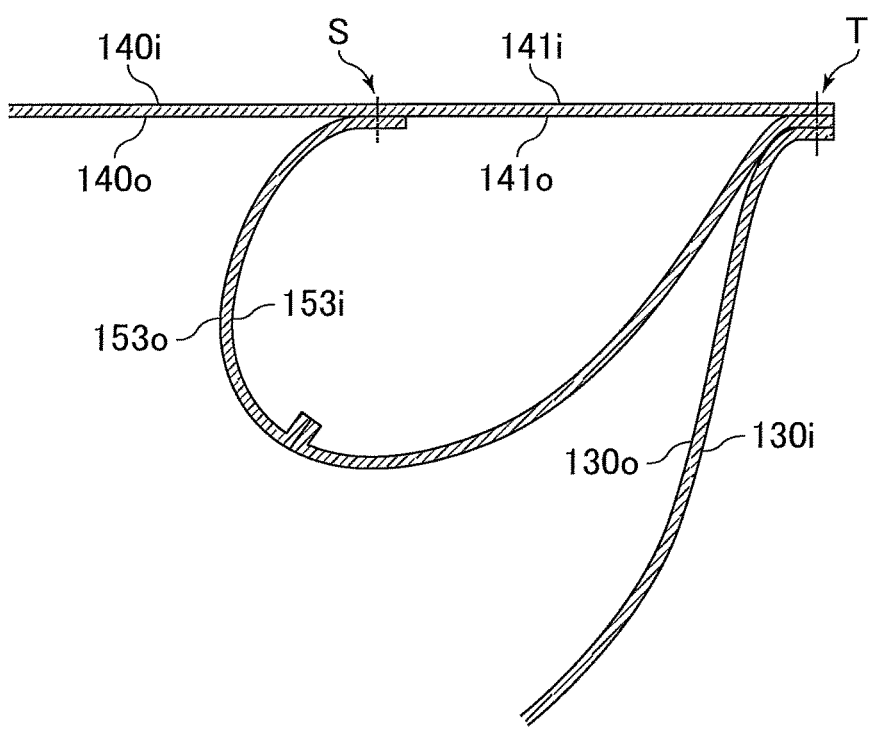
FIG. 14 is a cross-sectional view taken along the line B-B in FIG. 13.

FIG. 13 illustrates the process of joining the occupant protection fabric 170 and the inside-out base fabric 130. FIG. 14 is a cross-sectional view taken along the line B-B in FIG. 13. Before the occupant protection fabric 170 and the base fabric 130 are joined, the protruding portion 153 with an inside 153i being exposed as illustrated in FIGS. 10 and 11 is reversed, so that the base fabric 130 can be disposed to cover the protruding portion 155 with an outside 153o being exposed. The outer periphery of the occupant protection fabric 170 and the outer periphery of the base fabric 130 are joined such that the insides of the occupant protection fabric 170 and the base fabric 130 are exposed. In other words, the length of the outer periphery of the occupant protection fabric 170 and the length of the outer periphery of the base fabric 130 are substantially the same. The outer periphery of the occupant protection fabric 170 is formed by the parts of the open edges of the paired protruding portions 155 and 165 that are not joined with the outer periphery of the flat portion 145. The outer periphery of the base fabric 130 is formed by the open edge of the tubular workpiece on the side not joined with the base fabric piece 120 for a bottom portion. Also, when the outer periphery of the occupant protection fabric 170 is joined with the outer periphery of the base fabric 130, the tethers 141 and 142 extending to the outer periphery of the occupant protection fabric 170 are simultaneously joined. This method enables joining the tethers 141 and 142 provided to respectively control the shapes of the protruding portions 155 and 165 simultaneously with formation of the airbag 105 into a bag-like shape. That is, this method can exclude a dedicated process of installing the tethers 141 and 142, simplifying the processes of producing the airbag 105.

As illustrated in FIG. 14, at a point T where the outer periphery of the occupant protection fabric 170, the outer periphery of the base fabric 130, and the end of one of the tethers 141 and 142 are joined, the tether 141 or 142, the protruding portion 153, and the base fabric 130 are stacked in the given order and sewn. Here, an outside 141o of the tether and the inside 153i of the protruding portion face each other, and the outside 153o of the protruding portion and an outside 130o of the base fabric face each other. The sewing process can be made accurate and simple by placing the base fabric piece 140 for a flat portion on the worker side and the base fabric 130 on the bottom side.

Figure 15:
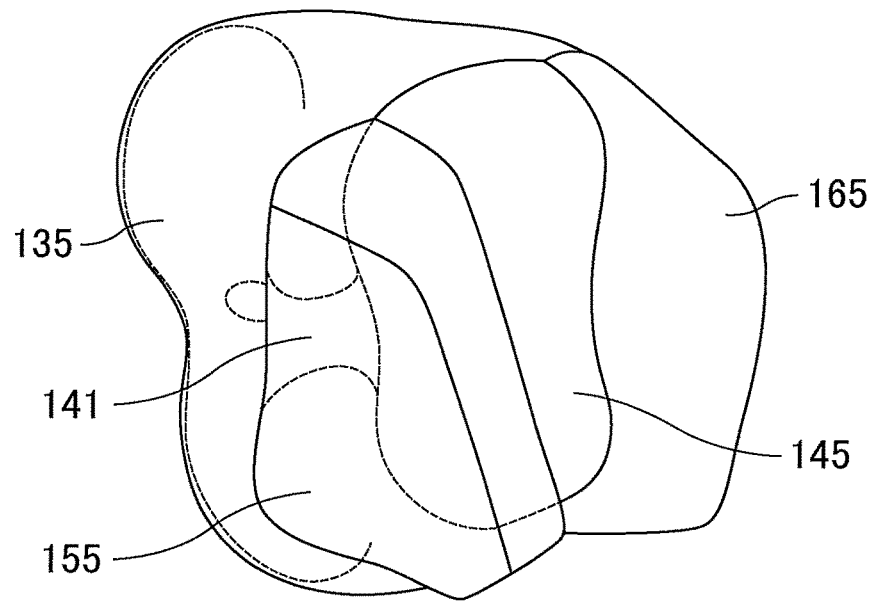
FIG. 15 is a perspective view of the airbag after the occupant protection fabric and the base fabric were joined and then the airbag was reversed.
Figure 16:
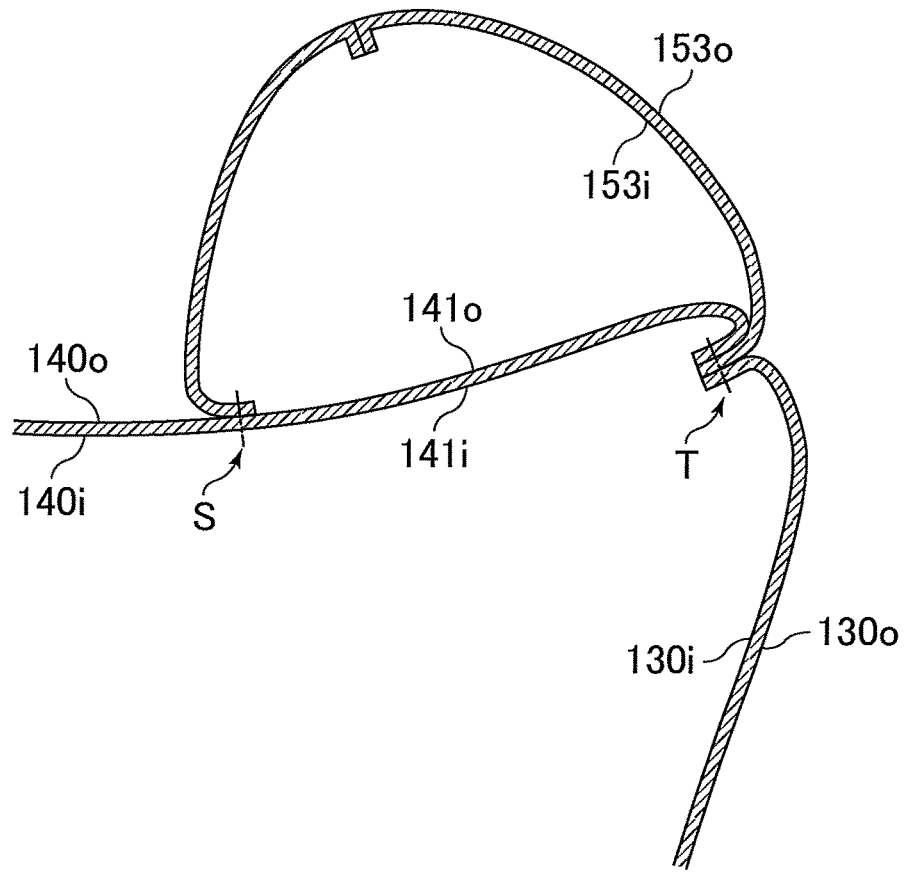
FIG. 16 is a cross-sectional view of the structure of the joint illustrated in FIG. 14 after the joint was reversed.

FIG. 15 is a perspective view of the airbag 105 after the occupant protection fabric 170 and the base fabric 130 were joined and the airbag 105 was reversed. FIG. 16 is a cross-sectional view of the structure of the joint illustrated in FIG. 14 after the joint was reversed. In the state where the occupant protection fabric 170 and the base fabric 130 are joined by the method illustrated in FIG. 13, the insides of the occupant protection fabric 170 and the base fabric 130 are exposed while the protruding portions 155 and 165 forming a recess protrudes toward the interior space of the base fabric 130. The outside of the occupant protection fabric 170, present in the airbag 105 whose inside is exposed, is then pulled out through the inflator installation hole 122, so that the airbag 105 in the present embodiment can be obtained whose protruding portions 155 and 165 protrudes out to the exterior space as illustrated in FIG. 15. After the airbag 105 is reversed, as illustrated in FIG. 16, the outside 140o of the base fabric piece for a flat portion, the outside 153o of the protruding portion, and the outside 130o of the base fabric are exposed, while the inside 140i of the base fabric piece for a flat portion, the inside 153i of the protruding portion, and the inside 130i of the base fabric face the interior space of the airbag 105. The outside 141o and the inside 141i of the tether are both positioned in the interior space of the airbag 105.

As described above, in the present embodiment, the bag-like airbag 105 is formed by forming the flat portion 145 continuous with the protruding portions 155 and 165 of the occupant protection fabric 170, and joining the outer periphery of the occupant protection fabric 170 with the outer periphery of the base fabric 130. The outer periphery of the flat portion 145 includes one end of each of the tethers 141 and 142, and therefore joining the outer periphery of the occupant protection fabric 170 with the outer periphery of the base fabric 130 enables simultaneous joining of the tethers 141 and 142 extending to the outer periphery of the occupant protection fabric 170. Thereby, the tethers 141 and 142 provided to respectively control the shapes of the protruding portions 155 and 165 can be joined simultaneously with formation of the airbag 105 into a bag-like shape. In other words, the method eliminates the need for a dedicated process of installing the tethers 141 and 142, decreasing the number of times of sewing. Also, since the sewn parts of the tethers 141 and 142 are directly observable before the airbag 105 is reversed, it is easy to check the installation state during or after the sewing, which leads to stable quality control of the airbag 105. Moreover, since the tethers 141 and 142 respectively have the sizes suited for the protruding portions 155 and 165, the handling and sewing thereof are easy. The present embodiment therefore enables stable production of the airbag 105 capable of protecting the occupant moving obliquely forward by simple processes.

In the present embodiment, in a state where the flat portion 145 is in contact with the head of the occupant, the ends of the protruding portions 155 and 165 on the vehicle rear side are preferably positioned closer to the vehicle rear side than the center of gravity position of the head of the occupant. Such an airbag can prevent the head of the occupant, having come into contact with the protruding portions 155 and 165, from moving away from the protruding portions 155 and 165, thereby stably protecting the head of the occupant moving obliquely forward. The center of gravity position of the head of the occupant is determined using a world frontal impact dummy.

In the present embodiment, the protruding portions 155 and 165 are three-dimensional components respectively formed by sewing of the polygonal, band-like base fabric pieces 150 and 160, and the band-like base fabric pieces 150 and 160 sewn each have a ring-shaped edge on one side in the extending direction, formed by bringing diagonally opposite ends of the polygonal, band-like base fabric piece 150 or 160 together and joining the edges of the piece brought together on the other side in the extending direction. Thereby, the boat-like three-dimensional protruding portions including a ring-shaped edge as an opening can be formed by flat sewing, whereby the processes can be simplified.

Although the present embodiment employs the paired protruding portions 155 and 165, one protruding portion may be provided on only one side of the flat portion 145. In this case, no tether is provided on the side without a protruding portion, and the flat portion extends to the outer periphery of the base fabric.

Although the present embodiment employs one tether for one protruding portion, two or more tethers may be provided for one protruding portion.

Although the present embodiment employs the tubular base fabric 135, the base fabric may be a flat fabric having a shape corresponding to the outer shape of the occupant protection fabric.

(Embodiment 2)

An airbag device of Embodiment 2 is different from the airbag device of Embodiment 1 in the shape of the base fabric piece for a flat portion which constitutes the airbag. The airbag device of Embodiment 2 includes communication holes connecting the space in the base fabric and the spaces in the protruding portions instead of providing tethers to the base fabric piece for a flat portion.

Figure 17:
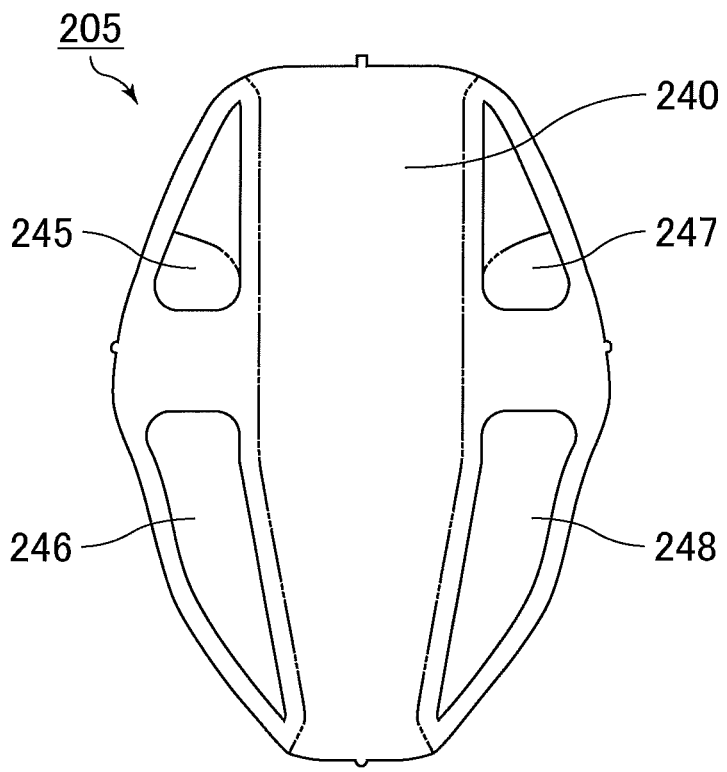
FIG. 17 illustrates a cross section of an airbag in Embodiment 2 including a flat portion.

FIG. 17 illustrates a cross section of an airbag in Embodiment 2 including a flat portion (base fabric piece for a flat portion). As illustrated in FIG. 17, an airbag 205 in Embodiment 2 is provided with a flat portion (base fabric piece for a flat portion) 240 that covers the opening of the base fabric on the vehicle rear side and includes communication holes 245, 246, 247, and 248 connecting the space in the base fabric and the spaces in the protruding portions. In the present embodiment, the portion between the communication hole 245 and the communication hole 246 and the portion between the communication hole 247 and the communication hole 248 function as the respective tethers in Embodiment 1.

Also, in the present embodiment, the outer periphery of the flat portion in the width direction of the vehicle constitutes the outer periphery of the occupant protection fabric, and is joined with the base edges of the protruding portions and the outer periphery of the base fabric.

The airbag 205 of the present embodiment can be produced by the same procedure as that in Embodiment 1 using the base fabric piece for a flat portion including the communication holes 245, 246, 247, and 248. Specifically, the bag-like airbag 205 is produced by joining one side of the base edge of the protruding portion covering the communication holes 245 and 246 from the rear side of the vehicle and one side of the base edge of the protruding portion covering the communication holes 247 and 248 from the rear side of the vehicle with the base fabric piece 240 for a flat portion, and joining the other sides of the base edges of the protruding portions constituting the outer periphery of the occupant protection fabric and the outer periphery of the base fabric piece 240 for a flat portion with the outer periphery of the base fabric. The present embodiment therefore also enables production of an airbag capable of protecting the occupant moving obliquely forward by simple processes.

Although the present embodiment employs the paired protruding portions, one protruding portion may be provided on only one side of the flat portion. In this case, no communication hole may be provided on the side without a protruding portion, and the flat portion may extend entirely to the outer periphery of the base fabric.

Although the present embodiment employs two communication holes for one protruding portion, one communication hole may be provided for one protruding portion, or three or more communication holes may be provided for one protruding portion.

Although the present embodiment employs the tubular base fabric, the base fabric may be a flat fabric having a shape corresponding to the outer shape of the occupant protection fabric.

(Embodiment 3)

The airbag device of the present invention may be disposed in front of the driver's seat to protect the occupant in the driver's seat. The preferred position for the airbag device in front of the driver's seat is the inside of the steering wheel. An airbag device of Embodiment 3 is suited for the case where the airbag is disposed inside the steering wheel, and is different from the airbag devices of Embodiments 1 and 2 in the shape of the airbag. The airbag in Embodiment 3 has a substantially circular shape as viewed from the rear side of the vehicle (the occupant side).

Figure 18:
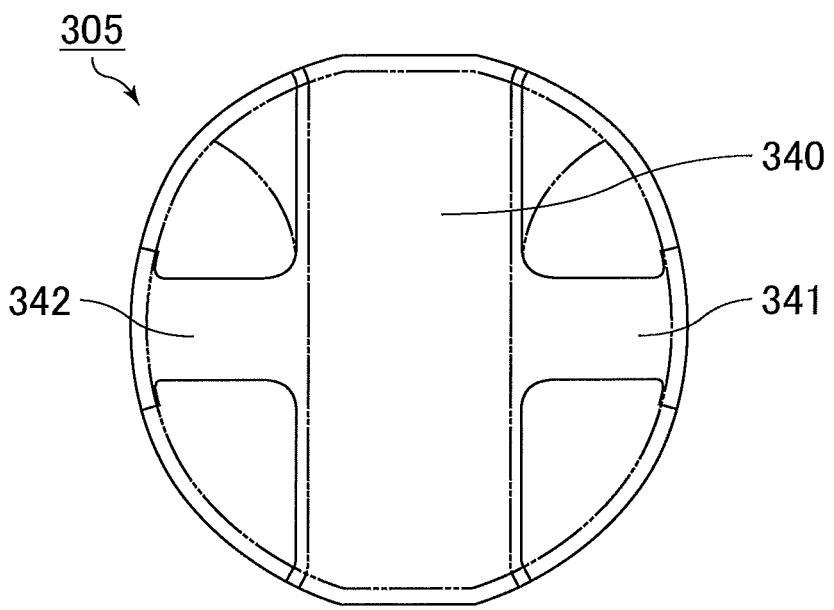
FIG. 18 illustrates one example of a cross section of an airbag in Embodiment 3 including a flat portion.

FIG. 18 illustrates one example of a cross section of an airbag in Embodiment 3 including a flat portion. An airbag 305 illustrated in FIG. 18 includes tethers 341 and 342 on the respective sides of a flat portion 340. Here, one protruding portion may be provided on only one side of the flat portion. In this case, no tether may be provided on the side without a protruding portion and the flat portion may extend entirely to the outer periphery of the base fabric. Also, two or more tethers may be provided for one protruding portion.

Figure 19:
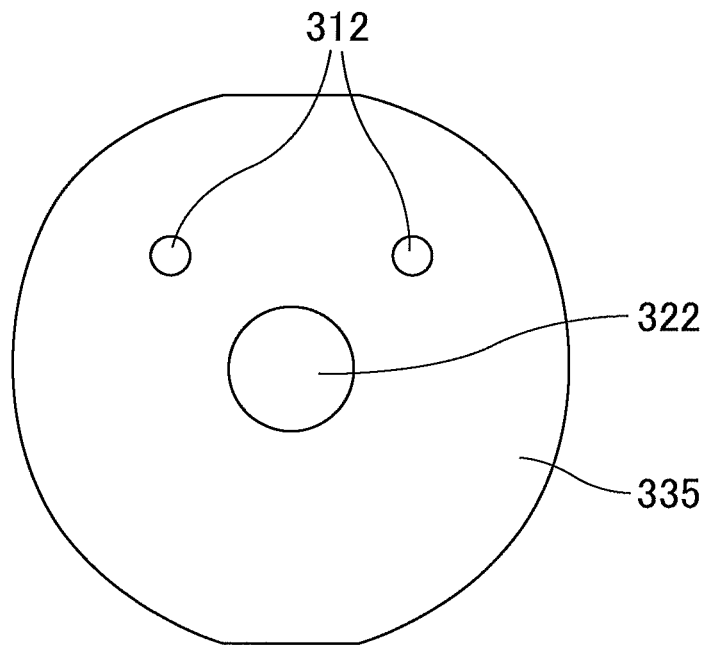
FIG. 19 is a schematic plan view of a base fabric in the airbag in Embodiment 3.

FIG. 19 is a schematic plan view of a base fabric in the airbag in Embodiment 3. As illustrated in FIG. 19, the airbag 305 employs, as a base fabric 335, a flat fabric having a shape corresponding to the outer shape of the occupant protection fabric. The base fabric 335 includes vent holes 312 and an inflator installation hole 322.

Figure 20:
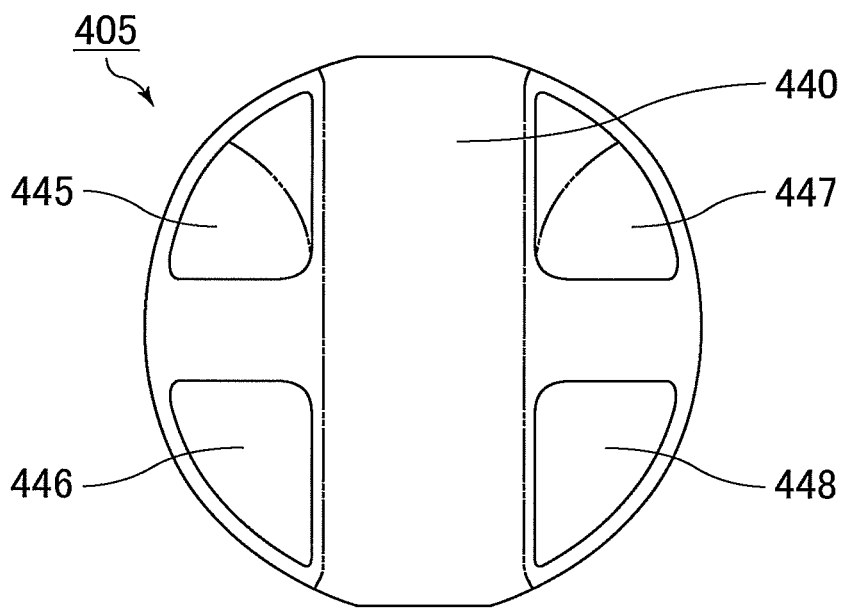
FIG. 20 illustrates another example of a cross section of the airbag in Embodiment 3 including a flat portion.
Figure 21:
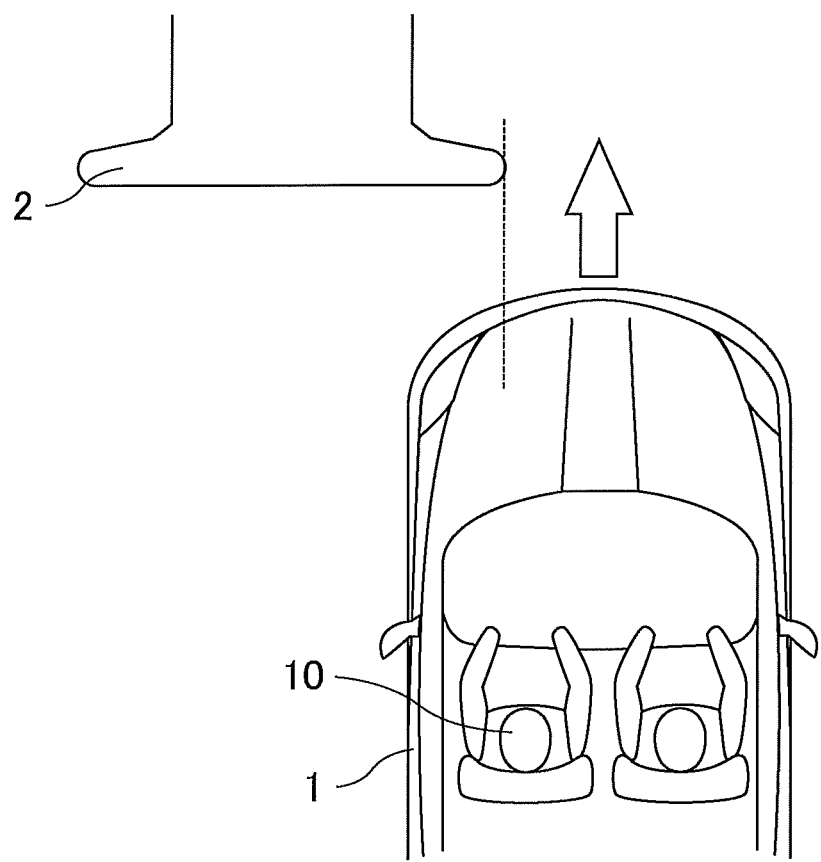
FIG. 21 illustrates a small overlap impact.

FIG. 20 illustrates another example of a cross section of the airbag in Embodiment 3 including a flat portion. An airbag 405 illustrated in FIG. 20 is provided with a flat portion (base fabric piece for a flat portion) 440 that includes communication holes 445, 446, 447, and 448 connecting the spaces in the protruding portions. Here, one protruding portion may be provided on only one side of the flat portion. In this case, no communication hole may be provided on the side without a protruding portion, and the flat portion may extend entirely to the outer periphery of the base fabric. Also, only one communication hole may be provided for one protruding portion, or three or more communication holes may be provided for one protruding portion. The airbag 405 can employ, as a base fabric, a flat fabric having a shape corresponding to the outer shape of the occupant protection fabric similar to the base fabric 335 illustrated in FIG. 19.

The embodiments of the present invention described above are not intended to limit the scope of the present invention. The configurations in the embodiments may appropriately be deleted, supplemented, modified, and combined within the spirit of the present invention.

What is claimed is:

1. An airbag device to be mounted in a vehicle, comprising:
   an inflator configured to generate a gas; and
   an airbag including a base fabric and an occupant protection fabric whose outer peripheries are joined together,
   the base fabric being provided with an installation hole for the inflator,
   the occupant protection fabric being positioned on a vehicle rear side of the base fabric and configured to restrain an occupant, and comprising:
      at least one protruding portion that is disposed along the outer periphery of at least one side of the occupant protection fabric in a vehicle width direction and configured to protrude to the vehicle rear side;
      a flat portion that is continuously formed from the at least one protruding portion and is designed to come into contact with the occupant; and
      a tether that is disposed between the base fabric and the at least one protruding portion in the airbag, extending from the flat portion to a joint between the occupant protection fabric and the base fabric,
   the tether being joined at one end with one of base edges of the at least one protruding portion and an outer periphery of the flat portion,
   the tether being joined at the other end with the other of the base edges of the at least one protruding portion and the outer periphery of the base fabric,
   the one of the base edges of the at least one protruding portion and an outer periphery of the flat portion, and the other of the base edges of the at least one protruding portion and the outer periphery of the flat portion being respectively superposed on the tether and disposed inside the airbag.

2. The airbag device according to claim 1,
   wherein the airbag device is configured so that when the flat portion is in contact with a head of the occupant, an end of the at least one protruding portion on the vehicle rear side is positioned closer to the vehicle rear side than a center of gravity position of the head of the occupant.

3. The airbag device according to claim 1,
   wherein the at least one protruding portion is a three-dimensional component formed by folding in half a first edge of a polygonal, band-shape base fabric piece in an extending direction of the polygonal, band-shape base fabric piece to superpose diagonally opposite ends of the polygonal, band-shape base fabric piece on each other and sewing the first edge, thereby forming a second edge on an other side of the polygonal, band-shape base fabric piece in the extending direction into a ring shape.

4. An airbag device to be mounted in a vehicle, comprising:
   an inflator configured to generate a gas; and an airbag including a base fabric and an occupant protection fabric whose outer peripheries are joined together, the base fabric being provided with an installation hole for the inflator, the occupant protection fabric being positioned on a vehicle rear side of the base fabric and configured to restrain an occupant, and comprising:

a flat portion that covers the vehicle rear side of the base fabric and is provided with at least one communication hole on at least one side of the flat portion in a vehicle width direction; and at least one protruding portion that covers the at least one communication hole from the vehicle rear side, is disposed along the outer periphery of at least one side of the occupant protection fabric in the vehicle width direction, and configured to protrude to the vehicle rear side from the flat portion, the outer periphery of at least one side of the flat portion in the vehicle width direction, constituting the outer periphery of the occupant protection fabric, being joined with a base edge of the at least one protruding portion and the outer periphery of the base fabric, wherein the at least one protruding portion is a three-dimensional component formed by folding in half a first edge of a polygonal, band-shape base fabric piece in an extending direction of the polygonal, band-shape base fabric piece to superpose diagonally opposite ends of the polygonal, band-shape base fabric piece on each other and sewing the first edge, thereby forming a second edge on an other side of the polygonal, band-shape base fabric piece in the extending direction into a ring shape.

5. The airbag device according to claim 4,

Wherein the airbag device is configured so that when the flat portion is in contact with a head of the occupant, an end of the at least one protruding portion on the vehicle rear side is positioned closer to the vehicle rear side than a center of gravity position of the head of the occupant.

\* \* \* \* \*

UNITED STATES PATENT AND TRADEMARK OFFICE
CERTIFICATE OF CORRECTION

| | |
|---|---|
| PATENT NO. | : 10,315,610 B2 |
| APPLICATION NO. | : 15/611323 |
| DATED | : June 11, 2019 |
| INVENTOR(S) | : Moritani et al. |

Page 1 of 1

It is certified that error appears in the above-identified patent and that said Letters Patent is hereby corrected as shown below:

In the Claims

Column 12, Lines 41-46 in Claim 1:
Delete: "the one of the base edges of the at least one protruding portion and an outer periphery of the flat portion, and the other of the base edges of the at least one protruding portion and the outer periphery of the flat portion being respectively superposed on the tether and disposed inside the airbag"

And insert: --the one of the base edges of the at least one protruding portion and the other of base edges of the at least one protruding portion being respectively superposed on the tether and disposed inside the airbag--.

Signed and Sealed this
Fifth Day of November, 2019

Andrei Iancu
*Director of the United States Patent and Trademark Office*